US012682799B2

(12) United States Patent
Lu et al.

(10) Patent No.: US 12,682,799 B2
(45) Date of Patent: Jul. 14, 2026

(54) PIXEL SHIFTING METHOD AND CONTROL METHOD OF DISPLAY SCREEN

(71) Applicant: PEGATRON CORPORATION, Taipei City (TW)

(72) Inventors: Chia-Ming Lu, Taipei City (TW); Sheng-Fu Kuo, Taipei City (TW); Min-Feng Chen, Taipei City (TW); Cheng-Yen Chang, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 0 days.

(21) Appl. No.: 18/815,940

(22) Filed: Aug. 27, 2024

(65) Prior Publication Data

US 2025/0157373 A1 May 15, 2025

(30) Foreign Application Priority Data

Nov. 9, 2023 (TW) ................................ 112143121

(51) Int. Cl.
*G09G 3/00* (2006.01)
*G09G 3/32* (2016.01)
*G09G 3/3225* (2016.01)

(52) U.S. Cl.
CPC ............... *G09G 3/007* (2013.01); *G09G 3/32* (2013.01); *G09G 3/3225* (2013.01); *G09G 2320/0257* (2013.01); *G09G 2320/0666* (2013.01)

(58) Field of Classification Search
CPC ...................................................... G09G 3/007
See application file for complete search history.

(56) References Cited

U.S. PATENT DOCUMENTS

2008/0111886 A1* 5/2008 Bai .......................... G09G 5/00 348/173
2018/0286356 A1 10/2018 Jiang et al.
2019/0156726 A1 5/2019 Chun
(Continued)

FOREIGN PATENT DOCUMENTS

CN 113126947 A 7/2021
JP 2003263131 A 9/2003
(Continued)

OTHER PUBLICATIONS

Korean Patent Office, Office Action issued on Jan. 20, 2025 for KR application No. 10-2024-0093698.
(Continued)

*Primary Examiner* — William Boddie
*Assistant Examiner* — Andrew B Schnirel
(74) *Attorney, Agent, or Firm* — Li & Cai Intellectual Property (USA) Office

(57) ABSTRACT

A pixel shifting method and a control method of a display screen are provided. The pixel shifting method is adapted for the display screen, and the display screen includes at least one processor to perform the following steps. When the display screen displays a picture, pixel shifting is performed on a central point of the picture according to a shifting path. A plurality of pixels on the shifting path is allowed to be sequentially displayed on the display screen according to a plurality of different color attributes. The color attribute of each of the plurality of pixels is changed after a cycle of the pixel shifting ends.

7 Claims, 9 Drawing Sheets

(56) References Cited

U.S. PATENT DOCUMENTS

| | | | | |
|---|---|---|---|---|
| 2020/0105182 | A1 | 4/2020 | Koo et al. | |
| 2021/0073007 | A1 | 3/2021 | Guzman et al. | |
| 2021/0097912 | A1 | 4/2021 | Seo | |
| 2021/0264830 | A1 | 8/2021 | Lee et al. | |
| 2022/0148522 | A1* | 5/2022 | Jang | G09G 3/3233 |
| 2023/0206816 | A1 | 6/2023 | Wu et al. | |

FOREIGN PATENT DOCUMENTS

| | | | |
|---|---|---|---|
| JP | 2007279105 | A | 10/2007 |
| KR | 1020220062802 | A | 5/2022 |

OTHER PUBLICATIONS

European Patent Office, Search Report issued on Jan. 7, 2025 for EP application No. 24200746.6.

* cited by examiner

PIXEL SHIFTING METHOD AND CONTROL METHOD OF DISPLAY SCREEN

CROSS-REFERENCE TO RELATED PATENT APPLICATION

This application claims the benefit of priority to Taiwan Patent Application No. 112143121, filed on Nov. 9, 2023. The entire content of the above identified application is incorporated herein by reference.

FIELD OF THE DISCLOSURE

The present disclosure relates to a control method of a display screen, and more particularly to a pixel shifting method and a control method of a display screen.

BACKGROUND OF THE DISCLOSURE

Due to un-uniform use counts of pixels on a display screen, some areas of the display screen are discolored, thereby resulting in image retention and an afterimage on the display screen.

When an organic light-emitting diode of the display screen displays a statically fixed text or pattern for a long time, the luminous efficiency of the organic light-emitting diode declines. In order to prevent the luminous efficiency of the display screen from declining, the pixels on the display screen are displaced.

However, since the current pixel shifting is a single shifting or plural shifting, a certain degree of damage may still occur to the organic light-emitting diode. In addition, an unexpected pixel shifting is a nuisance for a user who needs to use a stylus for delicate work.

SUMMARY OF THE DISCLOSURE

In response to the above-referenced technical inadequacy, the present disclosure provides a pixel shifting method and a control method of a display screen.

In order to solve the above-mentioned problem, one of the technical aspects adopted by the present disclosure is to provide a pixel shifting method. The pixel shifting method is adapted for a display screen, the display screen includes at least one processor to perform steps of: performing, when the display screen displays a picture, pixel shifting on a central point of the picture according to a shifting path; allowing a plurality of pixels on the shifting path to be sequentially displayed on the display screen according to a plurality of different color attributes; changing the color attribute of each of the plurality of pixels after a cycle of the pixel shifting ends.

In order to solve the above-mentioned problem, another one of the technical aspects adopted by the present disclosure is to provide a control method of a display screen. The control method includes configuring at least one processor to perform steps of: starting a timer; determining the timer expires or not; determining whether or not the display screen receive a touch signal when the timer expires; and performing, when the display screen does not receive a touch signal, the pixel shifting method as claimed in claim 1.

Therefore, in the pixel shifting method and the control method of the display screen provided by the present disclosure, the combination of pixel shifting and brightness change reduces the long duration of static images being displayed on the display screen and the wear and tear on light emitting units of the display screen, thereby improving the resilience against image retention or burn-in. In addition, users can avoid trouble caused by the pixel shifting when using the display screen.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
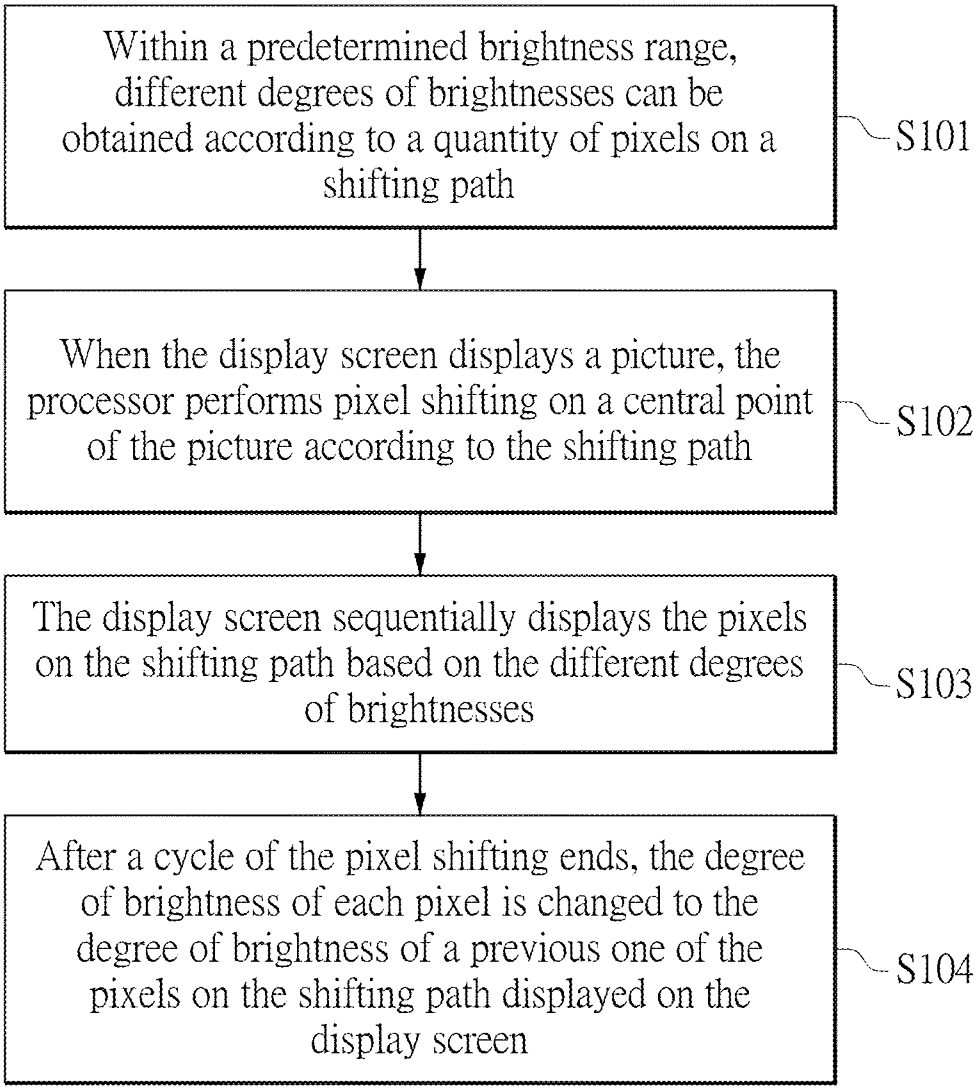
FIG. 1 is a flowchart of a pixel shifting method according to a first embodiment of the present disclosure.

FIG. 1 is a flowchart of a pixel shifting method according to a first embodiment of the present disclosure. The pixel shifting method is adapted for a display screen, and the display screen includes at least one processor to perform steps as following. In step S101, within a predetermined brightness range, different degrees of brightnesses can be obtained according to a quantity of pixels on a shifting path. Specifically, each pixel of the display screen may be generated by one or more organic light-emitting diodes. In step S102, when the display screen displays a picture, the processor performs pixel shifting on a central point of the picture according to the shifting path. Specifically, when the processor performs the pixel shifting on the central point, the central point sequentially moves along the pixels on the shifting path, so that the picture displayed on the screen moves correspondingly. In step S103, the display screen sequentially displays the pixels on the shifting path based on the different degrees of brightnesses. In step S104, after a cycle of the pixel shifting ends, the brightness of each pixel is changed to the brightness of a previous one of the pixels on the shifting path displayed on the display screen.

Figure 2:
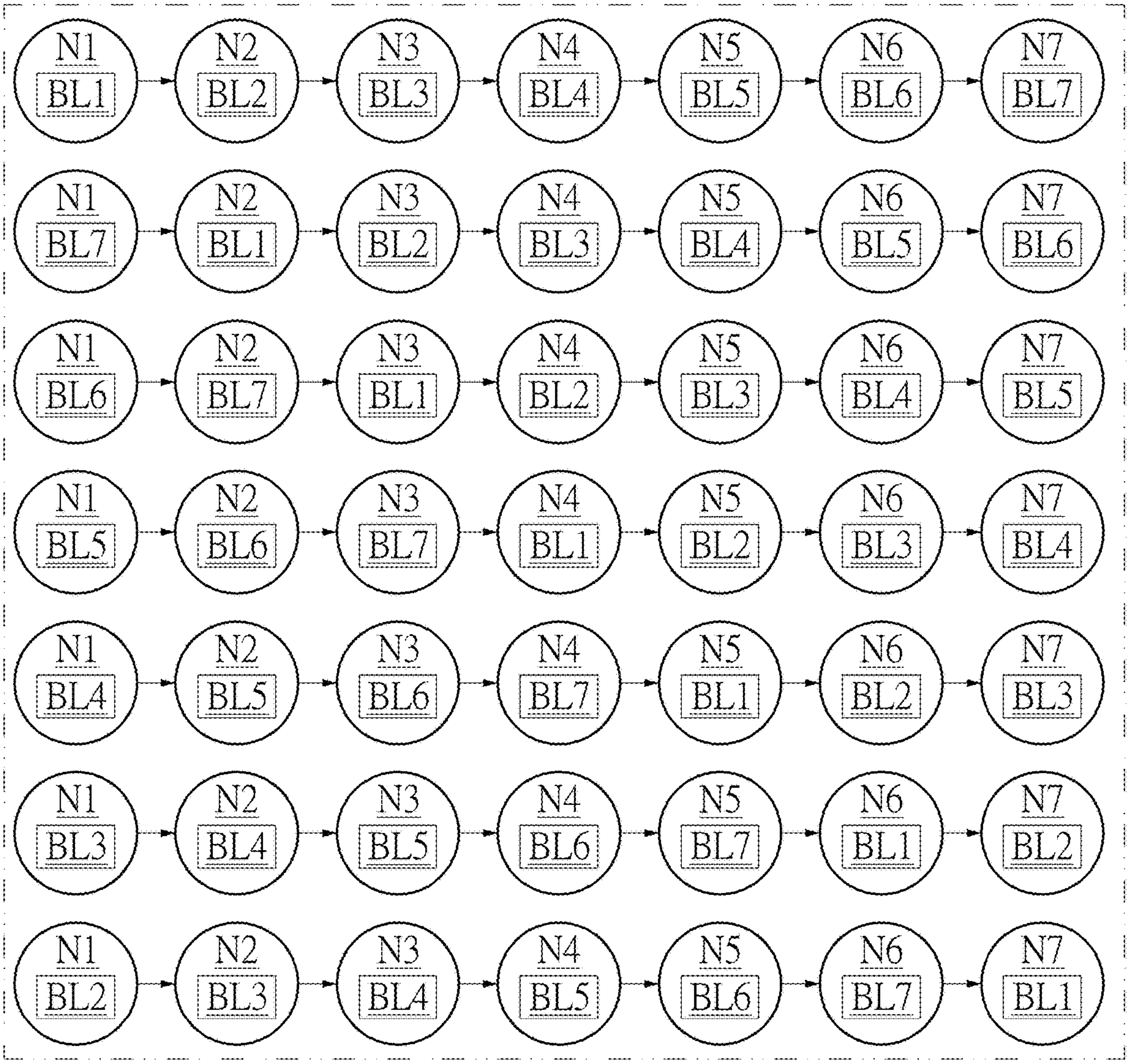
FIG. 2 is a schematic view of the pixel shifting method of FIG. 1.

FIG. 2 is a schematic view of the pixel shifting method of FIG. 1. For the simplicity, FIG. 2 only shows a first pixel N1, a second pixel N2, a third pixel N3, a fourth pixel N4, a fifth pixel N5, a sixth pixel N6, and a seventh pixel N7 on the display screen, but a quantity of the pixels of the display screen is not limited thereto.

Shifting from one pixel to another pixel is a display time interval, which is a reciprocal of a frame rate. Shifting from the first pixel N1 to the seventh pixel N7 is one pixel shifting cycle.

In a first pixel shifting cycle, the first pixel N1, the second pixel N2, the third pixel N3, the fourth pixel N4, the fifth pixel N5, the sixth pixel N6, and the seventh pixel N7 correspond to a first brightness BL1, a second brightness BL2, a third brightness BL3, a fourth brightness BL4, a fifth brightness BL5, a sixth brightness BL6, and a seventh brightness BL7, respectively.

In a second pixel shifting cycle, the first pixel N1, the second pixel N2, the third pixel N3, the fourth pixel N4, the fifth pixel N5, the sixth pixel N6, and the seventh pixel N7 correspond to the seventh brightness BL7, the first brightness BL1, the second brightness BL2, the third brightness BL3, the fourth brightness BL4, the fifth brightness BL5, and the sixth brightness BL6, respectively.

On this basis, in the seventh pixel shifting cycle, the first pixel N1, the second pixel N2, the third pixel N3, the fourth pixel N4, the fifth pixel N5, the sixth pixel N6, and the seventh pixel N7 correspond to the second brightness BL2, the third brightness BL3, the fourth brightness BL4, the fifth brightness BL5, the sixth brightness BL6, the seventh brightness BL7, and the first brightness BL1, respectively.

Figure 3:
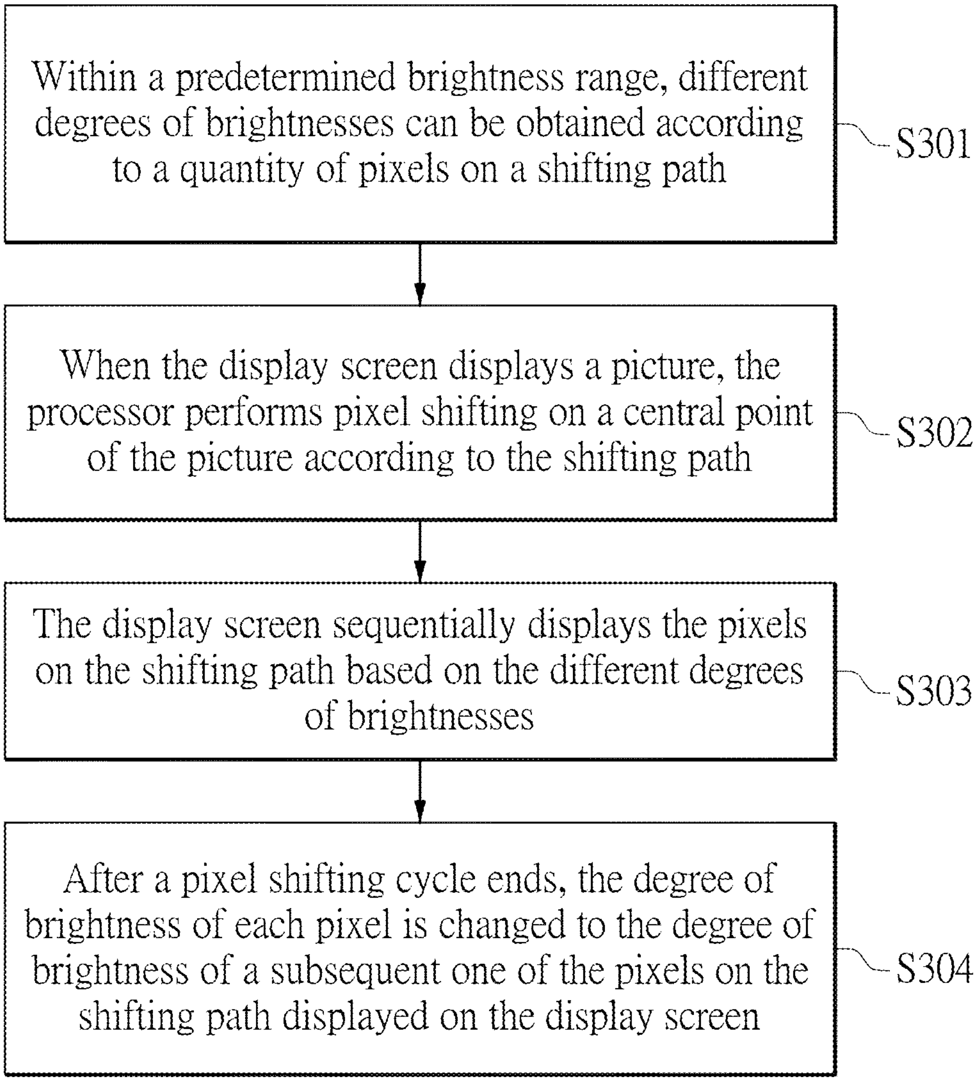
FIG. 3 is a flowchart of the pixel shifting method according to a second embodiment of the present disclosure.

FIG. 3 is a flowchart of the pixel shifting method according to a second embodiment of the present disclosure. The pixel shifting method of FIG. 3 includes steps S301 to S304. Step S304 of FIG. 3 is different from step S104 of FIG. 1. Steps S301 to S303 are the same as steps S101 to S103. In step S304, after a pixel shifting cycle ends, the brightness of each pixel is changed to the brightness of a subsequent one of the pixels on the shifting path displayed on the display screen.

Figure 4:
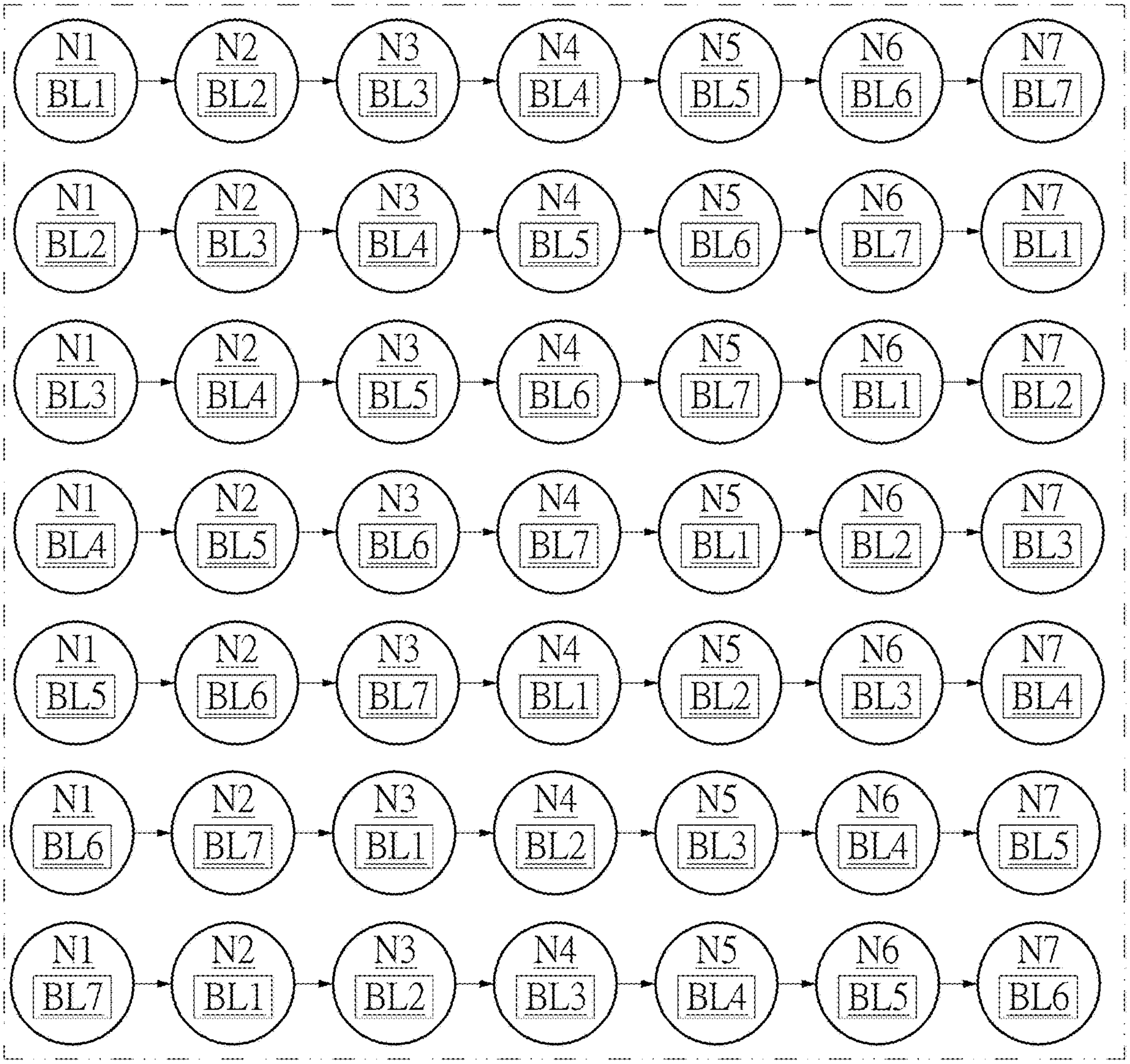
FIG. 4 is a schematic view of the pixel shifting method of FIG. 3.

FIG. 4 is a schematic view of the pixel shifting method of FIG. 3. For simplicity, FIG. 4 only shows the first pixel N1, the second pixel N2, the third pixel N3, the fourth pixel N4, the fifth pixel N5, the sixth pixel N6, and the seventh pixel N7 on the display screen. However, the quantity of the pixels of the display screen can be more than seven.

In the first pixel shifting cycle, the first pixel N1, the second pixel N2, the third pixel N3, the fourth pixel N4, the fifth pixel N5, the sixth pixel N6, and the seventh pixel N7 correspond to the first brightness BL1, the second brightness BL2, the third brightness BL3, the fourth brightness BL4, the fifth brightness BL5, the sixth brightness BL6, and the seventh brightness BL7, respectively.

In the second pixel shifting cycle, the first pixel N1, the second pixel N2, the third pixel N3, the fourth pixel N4, the fifth pixel N5, the sixth pixel N6, and the seventh pixel N7 correspond to the second brightness BL2, the third brightness BL3, the fourth brightness BL4, the fifth brightness BL5, the sixth brightness BL6, the seventh brightness BL7, and the first brightness BL1, respectively.

On this basis, in the seventh pixel shifting cycle, the first pixel N1, the second pixel N2, the third pixel N3, the fourth pixel N4, the fifth pixel N5, the sixth pixel N6, and the seventh pixel N7 correspond to the seventh brightness BL7, the first brightness BL1, the second brightness BL2, the third brightness BL3, the fourth brightness BL4, the fifth brightness BL5, and the sixth brightness BL6, respectively.

Briefly, the brightnesses of the pixels are changed periodically. That is, the brightness of a certain pixel in a pixel shifting cycle will be the same as the brightness of an adjacent pixel in a subsequent pixel shifting cycle.

The brightness mentioned in FIGS. 1 and 3 is one of the color attributes of the pixel. As for the pixel shifting method provided in the present disclosure, the color attribute of the pixel is not limited to the brightness. In other embodiments, the pixels on the shifting path can be sequentially displayed on the display screen with different colors. After a pixel shifting cycle ends, the color of each pixel is changed to be the same as that of the previous pixel or the subsequent pixel.

Figure 5:
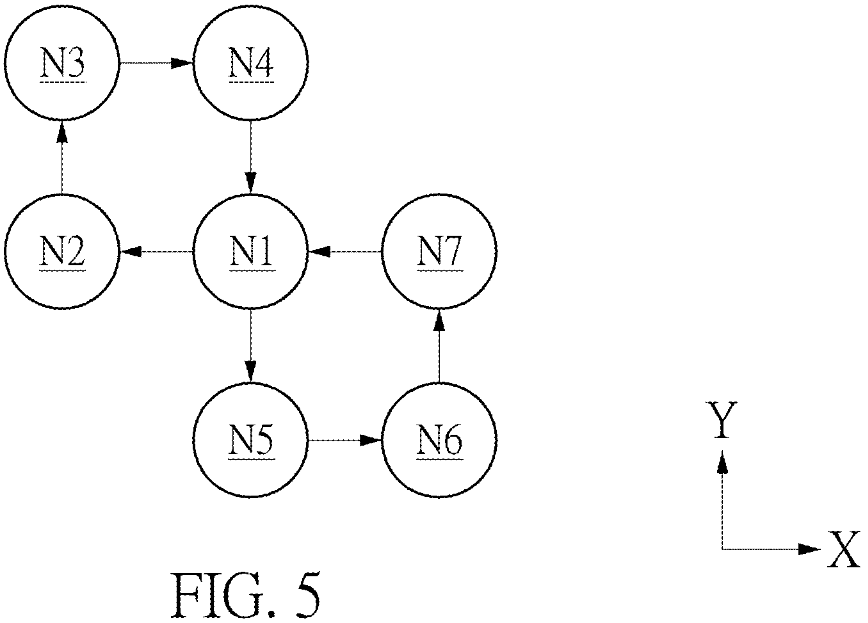
FIG. 5 is a schematic view of a shifting path having a figure-eight shape.

FIG. 5 is a schematic view of a shifting path having a figure-eight shape. For simplicity, FIG. 5 only shows the first pixel N1, the second pixel N2, the third pixel N3, the fourth pixel N4, the fifth pixel N5, the sixth pixel N6, and the seventh pixel N7. However, the quantity of the pixels of the display screen can be more than seven. The second pixel N2 is arranged by the first pixel N1 in a negative X-axis direction. The third pixel N3 is arranged by the second pixel N2 in a positive Y-axis direction. The fourth pixel N4 is arranged by the third pixel N3 in a positive X-axis direction. The fifth pixel N5 is arranged by the first pixel N1 in a negative Y-axis direction. The sixth pixel N6 is arranged by the fifth pixel N5 in the positive X-axis direction, and the seventh pixel N7 is arranged by the sixth pixel N6 in the positive Y-axis direction.

Initially, the central point of the picture displayed on the display screen is at the first pixel N1. After one display time interval (e.g., the reciprocal of the frame rate), the central point of the picture displayed on the display screen is shifted to the second pixel N2. After two display time intervals, the central point of the picture displayed on the display screen is shifted to the third pixel N3. On this basis, when the central point of the picture displayed on the display screen is shifted to the seventh pixel N7, a pixel shifting cycle ends. Then, the central point of the picture displayed on the display screen returns to the first pixel N1 again.

Figure 6:
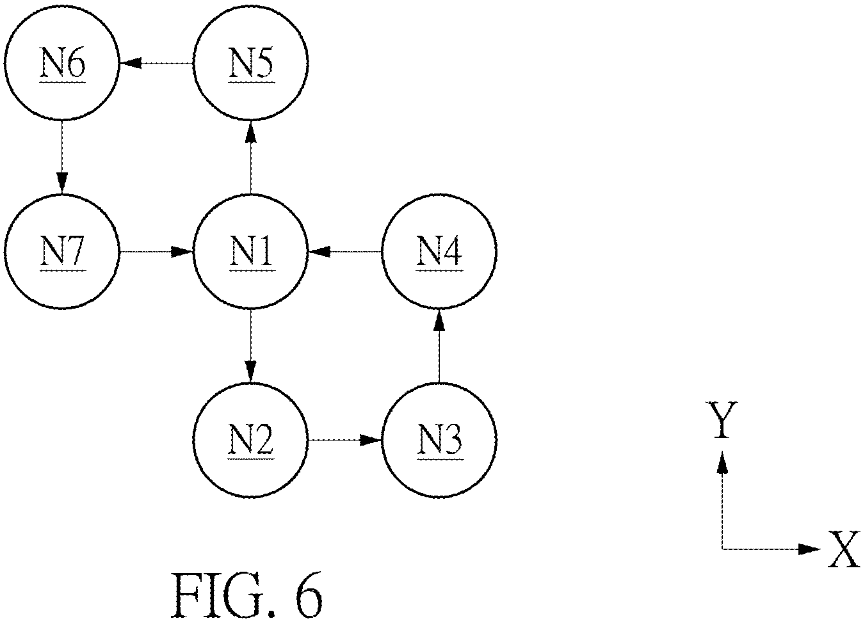
FIG. 6 is a schematic view of the shifting path having a quincunx shape.

FIG. 6 is a schematic view of the shifting path having a quincunx shape. FIG. 6 only shows the first pixel N1, the second pixel N2, the third pixel N3, the fourth pixel N4, the fifth pixel N5, the sixth pixel N6, and the seventh pixel N7. However, the quantity of the pixels of the display screen can be more than seven. The second pixel N2 is arranged by the first pixel N1 in the negative Y-axis direction. The third pixel N3 is arranged by the second pixel N2 in the positive X-axis direction. The fourth pixel N4 is arranged by the third pixel N3 in the positive Y-axis direction. The fifth pixel N5 is arranged by the first pixel N1 in the positive Y-axis direction. The sixth pixel N6 is arranged by the fifth pixel N5 in the negative X-axis direction, and the seventh pixel N7 is arranged by the sixth pixel N6 in the negative Y-axis direction.

Figure 7:
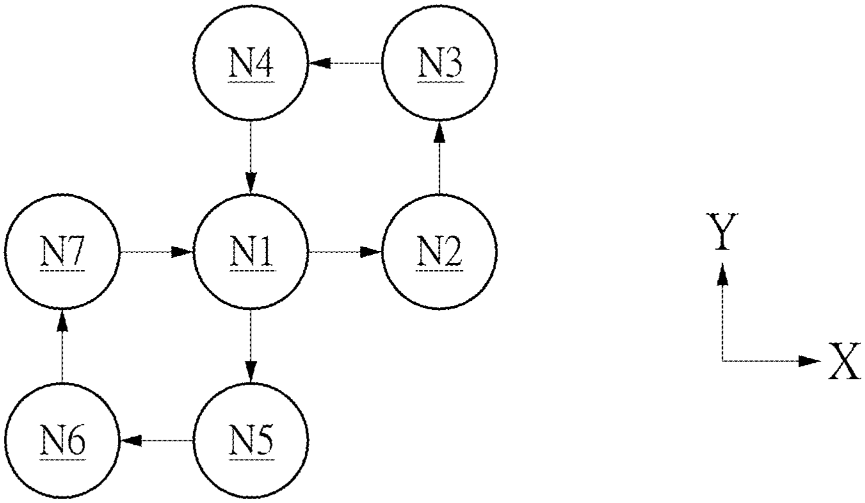
FIG. 7 is a schematic view of the shifting path having an inverse figure-eight shape.

FIG. 7 is a schematic view of the shifting path having an inverse figure-eight shape. FIG. 7 only shows the first pixel N1, the second pixel N2, the third pixel N3, the fourth pixel N4, the fifth pixel N5, the sixth pixel N6, and the seventh pixel N7. However, the quantity of the pixels of the display screen can be more than seven. The second pixel N2 is arranged by the first pixel N1 in the positive X-axis direction. The third pixel N3 is arranged by the second pixel N2 in the positive Y-axis direction. The fourth pixel N4 is arranged by the third pixel N3 in the negative X-axis direction. The fifth pixel N5 is arranged by the first pixel N1 in the negative Y-axis direction. The sixth pixel N6 is arranged by the fifth pixel N5 in the negative X-axis direction, and the seventh pixel N7 is arranged by the sixth pixel N6 in the positive Y-axis direction.

Figure 8:
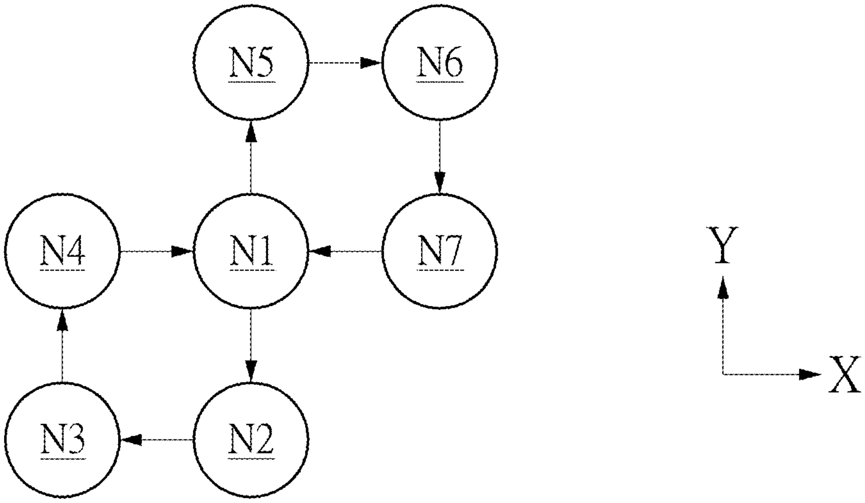
FIG. 8 is a schematic view of the shifting path having an inverse quincunx shape.

FIG. 8 is a schematic view of the shifting path having an inverse quincunx shape. FIG. 8 only shows the first pixel N1, the second pixel N2, the third pixel N3, the fourth pixel N4, the fifth pixel N5, the sixth pixel N6, and the seventh pixel N7. However, the quantity of the pixels of the display screen can be more than seven. The second pixel N2 is arranged by the first pixel N1 in the negative Y-axis direction. The third pixel N3 is arranged by the second pixel N2 in the negative X-axis direction. The fourth pixel N4 is arranged by the third pixel N3 in the positive Y-axis direction. The fifth pixel N5 is arranged by the first pixel N1 in the positive Y-axis direction. The sixth pixel N6 is arranged by the fifth pixel N5 in the positive X-axis direction, and the seventh pixel N7 is arranged by the sixth pixel N6 in the negative Y-axis direction.

Figure 9:
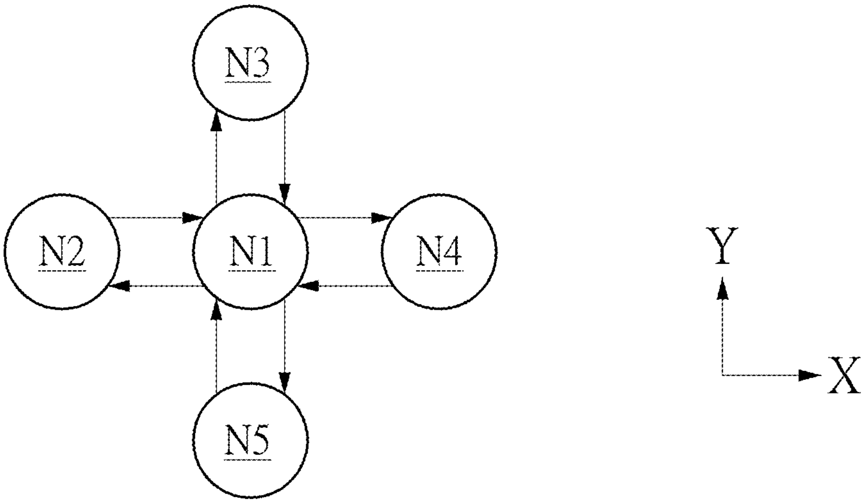
FIG. 9 is a schematic view of the shifting path having a cross shape.

FIG. 9 is a schematic view of the shifting path having a cross shape. FIG. 9 only shows the first pixel N1, the second pixel N2, the third pixel N3, the fourth pixel N4, and the fifth pixel N5. However, the quantity of the pixels of the display screen can be more than five. The second pixel N2 is arranged by the first pixel N1 in the negative X-axis direction. The third pixel N3 is arranged by the first pixel N1 in the positive Y-axis direction. The fourth pixel N4 is arranged by the first pixel N1 in the positive X-axis direction. The fifth pixel N5 is arranged by the first pixel N1 in the negative Y-axis direction.

Initially, the central point of the picture displayed on the display screen is at the first pixel N1. After one display time interval (e.g., the reciprocal of the frame rate), the central point of the picture displayed on the display screen is shifted to the second pixel N2. After two display time intervals, the central point of the picture displayed on the display screen returns to the first pixel N1 again. After three display time intervals, the central point of the picture displayed on the display screen is shifted to the third pixel N3. After four display time intervals, the central point of the picture displayed on the display screen returns to the first pixel N1 again. On this basis, when the central point of the picture displayed on the display screen is shifted to the fifth pixel N5, a pixel shifting cycle ends. Then, the central point of the picture displayed on the display screen returns to the first pixel N1 again.

It should be noted that the pixels N1 to N7 in FIGS. 5 to 8 correspond to the pixels N1 to N7 in FIG. 2 or FIG. 4. That is to say, according to the pixel shifting method of the present disclosure, the central point of the picture displayed on the display screen sequentially moves along the pixels on the shifting path, and the color or the brightness of each pixel is changed every shifting cycle.

Figure 10:
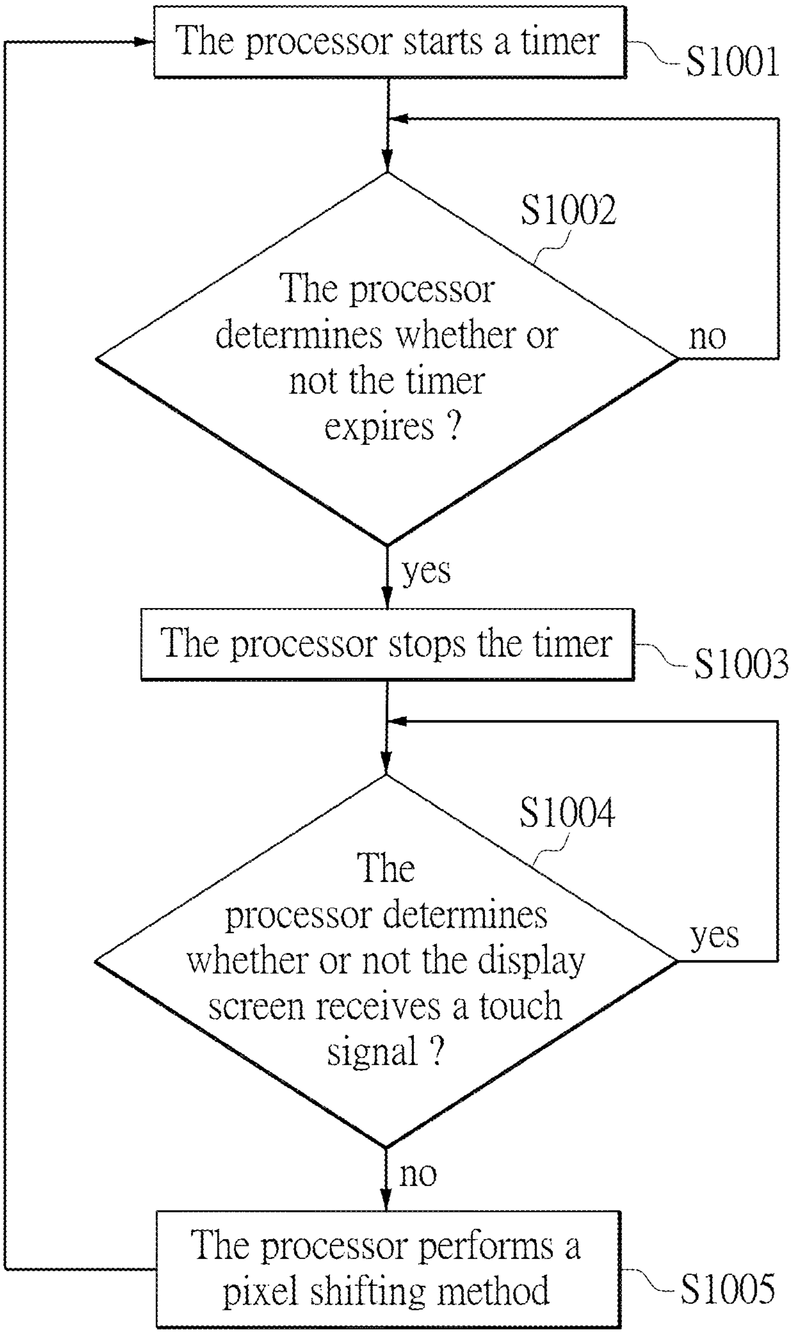
FIG. 10 is a flowchart of a control method of a display screen according to the first embodiment of the present disclosure.

FIG. 10 is a flowchart of a control method of a display screen according to the first embodiment of the present disclosure. The control method includes at least one processor to perform steps as following. In step S1001, the processor starts a timer. In step S1002, the processor determines whether or not the timer expires. When the timer expires, step S1002 is followed by step S1003. When the timer does not expires, the control method returns to step S1002.

In step S1003, the processor stops the timer. In step S1004, the processor determines whether or not the display screen receives a touch signal. When the display screen does not receive the touch signal, step S1004 is followed by step S1005. When the display screen receives the touch signal, the control method returns to step S1004.

In step S1005, the processor performs the pixel shifting method. Specifically, the processor performs the pixel shifting method provided in any one of the above-mentioned embodiments. After step S1005, the control method returns to step S1001.

Figure 11:
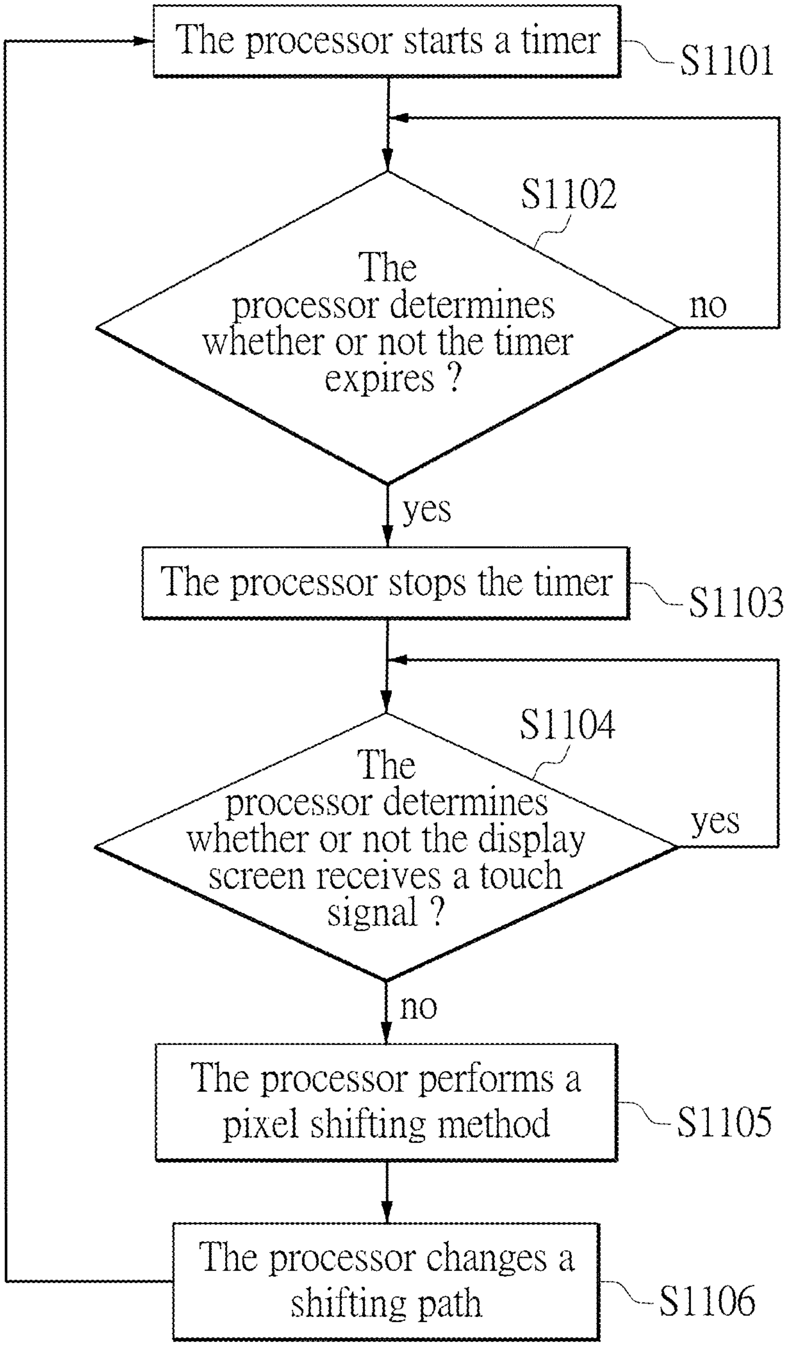
FIG. 11 is a flowchart of the control method of the display screen according to the second embodiment of the present disclosure.

FIG. 11 is a flowchart of the control method of the display screen according to the second embodiment of the present disclosure. The control method includes at least one processor to perform steps as following. In step S1101, the processor starts a timer. In step S1102, the processor determines whether or not the timer expires. When the timer expires, step S1102 is followed by step S1103. When the timer does not expire, the control method returns to step S1102.

In step S1103, the processor stops the timer. In step S1104, the processor determines whether or not the display screen receives a touch signal. When the display screen does not receive the touch signal, step S1104 is followed by step S1105. When the display screen receives the touch signal, the control method returns to step S1104.

In step S1105, the processor performs the pixel shifting method. In step S1106, the processor changes the shifting path. Then, the control method returns to step S1101. For example, when the processor performs the pixel shifting method for the first time, the shifting path having a figure-eight shape is used. When the processor performs the pixel shifting method for the second time, the shifting path having a quincunx shape is used. When the processor executes the pixel shifting method for the third time, the shifting path having an inverse figure-eight shape is used. When the processor executes the pixel shifting method for the fourth time, the shifting path having an inverse quincunx shape is used. When the processor executes the pixel shifting method for the fifth time, the shifting path having a cross shape is used. When the processor executes the pixel shifting method for the sixth time, the shifting path having the figure-eight shape is used again, and so on.

Simply speaking, when a stylus or a finger touches the display screen, a sensing circuit of the display screen sends the touch signal to the processor. When the processor receives the touch signal, the processor determines that the display screen is in use and stops executing the pixel shifting, so as to prevent the execution of the pixel shifting from interfering with user operation. The processor does not start to perform the pixel shifting until the processor stop receiving the touch signal.

Beneficial Effects of the Embodiments

In conclusion, in the pixel shifting method and the control method of the display screen provided by the present disclosure, the combination of pixel shifting and brightness change reduces the long duration of static images being displayed on the display screen and the wear and tear on light emitting units of the display screen, thereby improving the resilience against image retention or burn-in. In addition, users can avoid trouble caused by the pixel shifting when using the display screen.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control method of a display screen, comprising configuring at least one processor to perform steps of:

starting a timer which expires after a predetermined period;

determining whether or not the timer has reached the predetermined period;

determining whether or not the display screen receives a touch signal when the timer has reached the predetermined period; and performing, when the display screen does not receive the touch signal and the timer has reached the predetermined period, a pixel shifting method;

wherein the pixel shifting method includes:

obtaining different brightnesses within a predetermined brightness range according to a quantity of a plurality of pixels of a shifting path;

wherein the plurality of pixels of the shifting path display different brightnesses respectively;

when the display screen displays a picture, performing pixel shifting on a central point of the picture along the shifting path;

wherein one cycle of the pixel shifting ends when the central point is shifted from a first pixel of the shifting path to a last pixel of the shifting path; and changing the brightness of each of the plurality of pixels of the shifting path when a next cycle of the pixel shifting starts.

2. The control method according to claim 1, wherein the step of changing the brightness of each of the plurality of pixels comprises changing the brightness of each of the plurality of pixels to the brightness of a previous pixel of the plurality of pixels on the shifting path.

3. The control method according to claim 1, wherein the step of changing the brightness of each of the plurality of pixels comprises changing the brightness of each of the plurality of pixels to the brightness of a subsequent pixel of the plurality of pixels on the shifting path.

4. The control method according to claim 1, wherein, each of the plurality of pixels is generated by at least one organic light-emitting diode.

5. The control method according to claim 1, wherein the shifting path comprises a figure-eight shape, a quincunx shape, an inverse figure-eight shape, an inverse quincunx shape or a cross shape.

6. The control method according to claim 1, wherein the step of performing the pixel shifting on the central point of the picture comprises sequentially moving the central point of the picture along the plurality of pixels on the shifting path.

7. The control method according to claim 1, further comprising changing the shifting path when the timer is started again.

* * * * *